United States Patent
Yang et al.

(10) Patent No.: US 7,787,264 B2
(45) Date of Patent: Aug. 31, 2010

(54) APPARATUS TO PROVIDE SYNCHRONOUS RECTIFYING CIRCUIT FOR FLYBACK POWER CONVERTERS

(75) Inventors: Ta-yung Yang, Milpitas, CA (US); Tso-Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 527 days.

(21) Appl. No.: 11/782,901

(22) Filed: Jul. 25, 2007

(65) Prior Publication Data
US 2009/0027926 A1    Jan. 29, 2009

(51) Int. Cl.
*H02M 3/335*    (2006.01)
(52) U.S. Cl. .................... 363/21.06; 363/89
(58) Field of Classification Search .......... 363/21.06, 363/21.14, 84, 89, 125, 127
See application file for complete search history.

(56) References Cited

U.S. PATENT DOCUMENTS

| | | | | |
|---|---|---|---|---|
| 6,026,005 | A * | 2/2000 | Abdoulin | 363/89 |
| 6,426,884 | B1 * | 7/2002 | Sun | 363/17 |
| 6,870,747 | B2 * | 3/2005 | Bridge | 363/21.06 |
| 6,995,991 | B1 * | 2/2006 | Yang et al. | 363/21.14 |
| 7,599,198 | B2 * | 10/2009 | Tao et al. | 363/17 |
| 7,616,457 | B2 * | 11/2009 | Yang | 363/21.06 |
| 7,701,733 | B2 * | 4/2010 | Yang et al. | 363/21.06 |
| 2008/0310203 | A1 * | 12/2008 | Yang et al. | 363/126 |
| 2009/0027926 | A1 * | 1/2009 | Yang et al. | 363/21.14 |
| 2009/0091960 | A1 * | 4/2009 | Yang | 363/127 |
| 2009/0141521 | A1 * | 6/2009 | Yang | 363/49 |
| 2009/0219003 | A1 * | 9/2009 | Yang | 323/283 |

FOREIGN PATENT DOCUMENTS

| | | |
|---|---|---|
| CN | 2540657 | 3/2003 |
| CN | 1144345 C | 3/2004 |
| CN | 1564445 | 1/2005 |
| CN | 1697296 | 11/2005 |
| CN | 1945948 | 4/2007 |
| JP | 2001-069756 | 3/2001 |
| JP | 2005-020970 | 1/2005 |

* cited by examiner

*Primary Examiner*—Adolf Berhane
(74) *Attorney, Agent, or Firm*—J.C. Patents (57) ABSTRACT

A synchronous rectifying circuit is provided for flyback power converter. A pulse generator is utilized to generate a pulse signal in response to a leading edge and a trailing edge of a switching signal. The switching signal is used for switching the transformer of the power converter. An isolation device such as pulse transformer or small capacitors is coupled to the pulse generator for transferring the pulse signal through an isolation barrier of a transformer. A synchronous rectifier includes a power switch and a control circuit. The power switch is connected in between the secondary side of the transformer and the output of the power converter for the rectifying operation. The control circuit having a latch is operated to receive the pulse signal for controlling the power switch.

11 Claims, 6 Drawing Sheets

APPARATUS TO PROVIDE SYNCHRONOUS RECTIFYING CIRCUIT FOR FLYBACK POWER CONVERTERS

BACKGROUND OF THE INVENTION

1. Field of Invention

The present invention relates in general to a control circuit of power converter, and more particularly, to a synchronous rectifying control circuit for power converter.

2. Description of Related Art

An offline power converter includes a power transformer to provide isolation from AC line input to the output of the power converter for safety. In recent development, applying the synchronous rectifier on the secondary side of the transformer is to achieve a high efficiency conversion for power converters, such as "PWM controller for synchronous rectifier of flyback power converter" by Yang, et al. U.S. Pat. No. 6,995,991. However, the disadvantage of this prior art is the propagation delay of the switching signal detection and the phase-locking, which degrades the performance of the synchronous rectifier. Besides, the switching current detection causes additional power consumption by the ESR of the output capacitor. The switching signal's phase-lock and the current sense are required to facilitate the synchronous rectifier operation in both continuous mode and discontinuous mode. The object of present invention is to provide a reliable synchronous rectifying circuit, which can achieve higher efficiency. Besides, no current sense device and no phase-lock circuit are required for both continuous mode and discontinuous mode operations.

SUMMARY OF THE INVENTION

A synchronous rectifying circuit is developed to improve the efficiency of the power converter. The synchronous rectifying circuit includes a pulse generator for generating a pulse signal in response to the rising edge and the falling edge of a switching signal. The switching signal is utilized to switch a transformer and regulate the power converter. An isolation device, such as a pulse transformer or capacitors, is coupled to the pulse generator to transfer the pulse signal from the primary side of the transformer to the secondary side of the transformer. A synchronous rectifier comprises a power switch and a control circuit. The power switch is coupled to the secondary side of the transformer and operated as a rectifier. The control circuit is operated to receive the pulse signal for turning on/off the power switch. The pulse signal is a trig signal. The pulse width of the pulse signal is shorter than the pulse width of the switching signal. For the discontinuous mode operation, the pulse generator further generates a pulse signal to turn off the power switch in accordance with the pulse width of the switching signal and the input voltage of the power converter. Additionally, the maximum on time of the power switch is limited by a maximum on time circuit.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
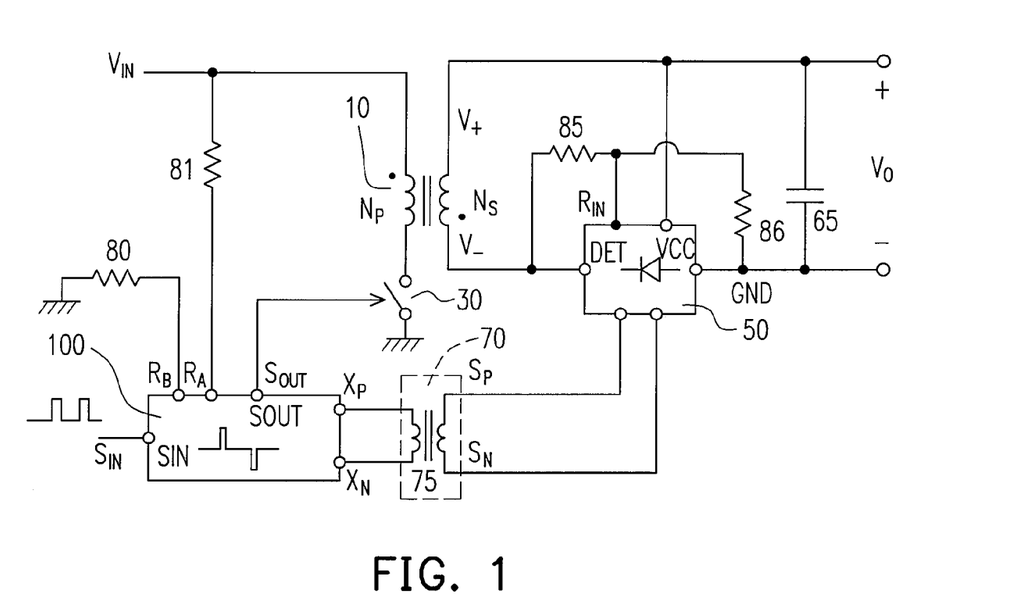
FIG. 1 shows an embodiment of a flyback power converter with synchronous rectifier according to the present invention.

FIG. 1 shows an embodiment of a power converter with synchronous rectifier according to the present invention. The power converter includes a transformer 10 having a primary side and a secondary side. The primary side of the transformer 10 comprises a power switch 30 for switching the transformer 10. The secondary side includes a first terminal V+ and a second terminal V−. A switching voltage is produced across the second terminal V− and the first terminal V+ in response to the switching of the transformer 10. A synchronous rectifier 50 comprises a rectifying terminal DET connected to the second terminal V−. A ground terminal GND of the synchronous rectifier 50 is connected to the output of the power converter. An input terminal $R_{IN}$ is coupled to receive the switching voltage through resistors 85 and 86. A first input terminal $S_P$ and a second input terminal $S_N$ of the synchronous rectifier 50 are connected to the secondary side of an isolation device 70 to receive a pulse signal for turning on/off the synchronous rectifier 50. The isolation device 70 can be a pulse transformer 75 or capacitors. The synchronous rectifier 50 further comprises a VCC terminal, coupled to an output voltage $V_O$ of the power converter.

A pulse generator 100 comprises an input signal terminal SIN coupled to receive a switching signal $S_{IN}$ for generating the pulse signal in response to the rising (leading) edge and the falling (trailing) edge of the switching signal $S_{IN}$. The switching signal $S_{IN}$ is developed to switch the transformer 10 and regulate the power converter. The pulse signal is produced on a first output terminal $X_P$ and a second output terminal $X_N$ of the pulse generator 100. The pulse signal is a differential signal. The polarity of the pulse signal determines turning on or turning off the synchronous rectifier 50. In order to produce the pulse signal before the transformer 10 is switched, the pulse generator 100 further generates a drive signal $S_{OUT}$ at the output terminal SOUT in response to the switching signal $S_{IN}$. The drive signal $S_{OUT}$ is coupled to switch the transformer 10 through the power switch 30. A time delay is developed between the enabling of the switching signal $S_{IN}$ and the enabling of the drive signal $S_{OUT}$.

The first output terminal $X_P$ and the second output terminal $X_N$ of the pulse generator 100 are coupled to the isolation device 70 to transfer the pulse signal from the primary side to the secondary side of the transformer 10. The pulse width of the pulse signal is shorter than the pulse width of the switching signal $S_{IN}$. The pulse signal is a trig signal with high frequency elements. Therefore, only a small pulse transformer or small capacitors are required, which reduce the space utilization on the PCB and reduce the cost of the power converter. The pulse generator 100 further includes an input voltage terminal $R_A$ coupled to receive an input voltage signal representative of an input voltage $V_{IN}$ of the transformer 10. The input voltage terminal $R_A$ is coupled to the input voltage $V_{IN}$ via a resistor 81. A program terminal $R_B$ of the pulse generator 100 is coupled to generate a program signal through a resistor 80. When the power converter is operated in a discontinuous mode, the pulse generator 100 can produce an additional pulse signal to turn off the synchronous rectifier 50 in accordance with the input voltage signal, the program signal and the pulse width of the switching signal $S_{IN}$.

Figure 2:
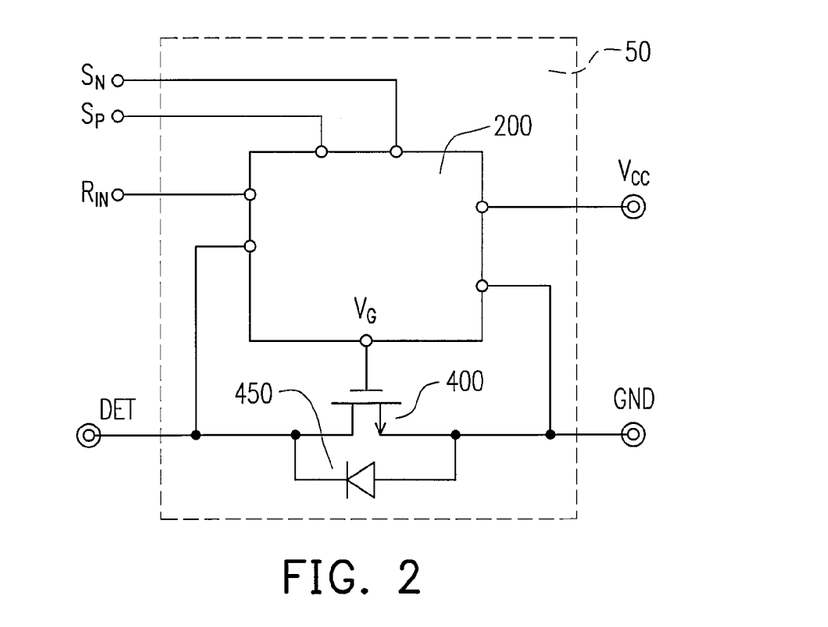
FIG. 2 is a schematic diagram of a synchronous rectifier according to the present invention.

FIG. 2 is the schematic diagram of an embodiment of the synchronous rectifier 50. The synchronous rectifier 50 includes a power switch 400, a diode 450 and a control circuit 200. The diode 450 is connected to the power switch 400 in parallel. The power switch 400 is connected in between the rectifying terminal DET and the ground terminal GND. The rectifying terminal DET is coupled to the secondary side of the transformer 10. The ground terminal GND is coupled to the output of the power converter. The control circuit 200 is coupled to receive the pulse signal via the first input terminal $S_P$ and the second input terminal $S_N$ for turning on/off the power switch 400. The input terminal RIN is utilized to receive the switching voltage of the transformer. A VCC terminal is utilized to supply the power source to the control circuit 200. The VCC terminal is normally connected to the output voltage $V_O$ of the power converter.

Figure 3:
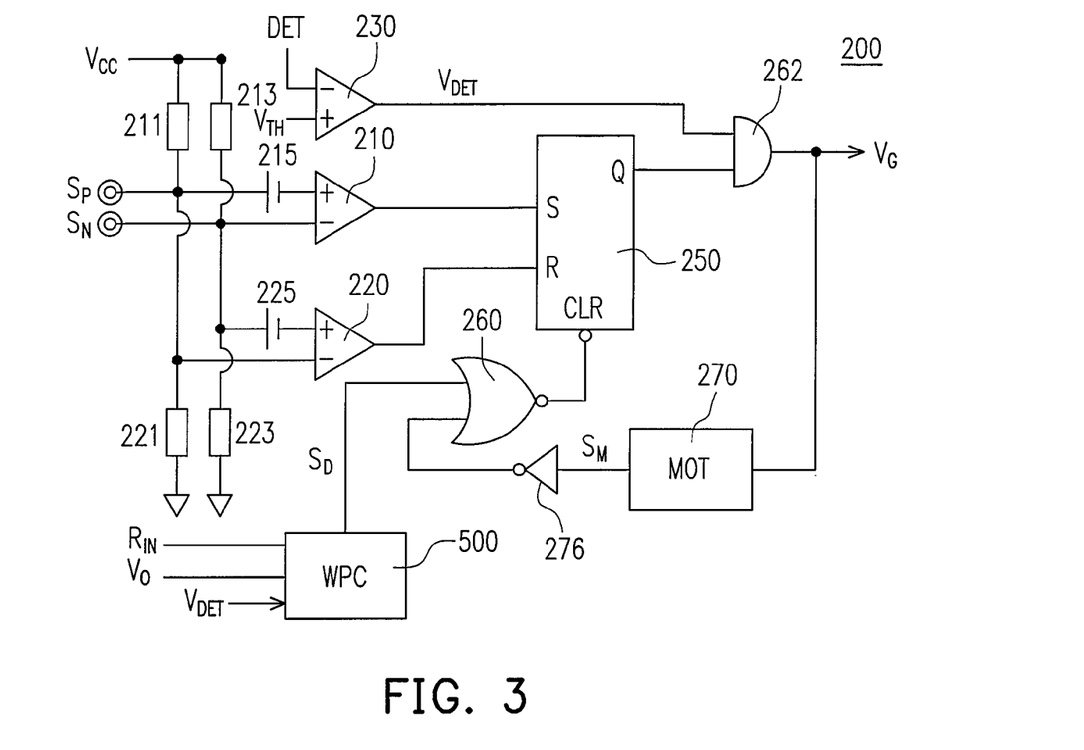
FIG. 3 is an embodiment of a control circuit of the synchronous rectifier according to the present invention.

FIG. 3 shows an embodiment of the control circuit 200 of FIG. 2. Resistors 211 and 221 provide a bias termination for the first input terminal $S_P$. Resistors 213 and 223 provide another bias termination for the second input terminal $S_N$. The first input terminal $S_P$ is coupled to the positive input of a comparator 210 and the negative input of a comparator 220. The second input terminal $S_N$ is coupled to the positive input of a comparator 220 and the negative input of a comparator 210. Comparators 210 and 220 comprise offset voltages 215 and 225 respectively, which produces hysteresis. A third comparator 230 having a threshold VTH connects to its positive input. The negative input of the comparator 230 is coupled to the rectifying terminal DET. The output of comparator 210 is coupled to the set-input (S terminal) of a SR flip-flop 250. The reset-input (R terminal) of the SR flip-flop 250 is controlled by the output of the comparator 220. The output of the SR flip-flop 250 and the output of the comparator 230 $V_{DET}$ are connected to an AND gate 262. A gate-drive signal $V_G$ is generated at the output of the AND gate 262 for controlling the on or off status of the power switch 400. The maximum on time of the gate-drive signal $V_G$ is limited by a maximum on time (MOT) circuit 270. The gate-drive signal $V_G$ is connected to the maximum on time circuit 270. After a blanking time, a maximum-on-time signal $S_M$ will be produced in response to the enabling of the gate-drive signal $V_G$. The maximum-on-time signal $S_M$ is connected to an NOR gate 260 through an inverter 276. Another input of the NOR gate 260 is connected to the output of a pulse-width-predict circuit (WPC) 500. The output of the NOR gate 260 is coupled to clear (reset) the SR flip-flop 250 through the clear terminal of the SR flip-flop 250. The maximum on time of the gate-drive signal $V_G$ is thus limited by the blanking time of the maximum on time circuit 270.

Besides, a discontinuous-mode signal $S_D$ of the pulse-width-predict circuit 500 will be generated to clear the SR flip-flop 250 and turn off the power switch 400 when the transformer 10 is fully demagnetized. The input terminal $R_{IN}$, the output voltage $V_O$ of the power converter through the VCC terminal and the output $V_{DET}$ of the comparator 230 are connected to the pulse-width-predict circuit 500. The switching voltage of the transformer 10 and the output voltage of the power converter are used for predicting the demagnetizing time of the transformer 10. The gate-drive signal $V_G$ will turn off the power switch 400 once the pulse signal is generated as, $$V_{SN} - V_{SP} > V_{225} \quad (1)$$

The gate-drive signal VG will turn on the power switch 400 when equations (2) and (3) are met, $$V_{SP} - V_{SN} > V_{215} \quad (2)$$

$$V_{DET} < V_{TH} \quad (3)$$

where $V_{SP}$ is the voltage of the first input terminal $S_P$; $V_{SN}$ is the voltage of the second input terminal $S_N$. $V_{DET}$ is the voltage of the rectifying terminal DET. $V_{TH}$ is the voltage of the threshold $V_{TH}$; $V_{215}$ is the value of the offset voltage 215; and $V_{225}$ is the value of the offset voltage 225.

The voltage of the rectifying terminal DET will be lower than the voltage of the threshold $V_{TH}$ once the diode 450 is conducted. It shows the power switch 400 can only be turned on after the diode 450 is turned on (forward biased).

Figure 4:
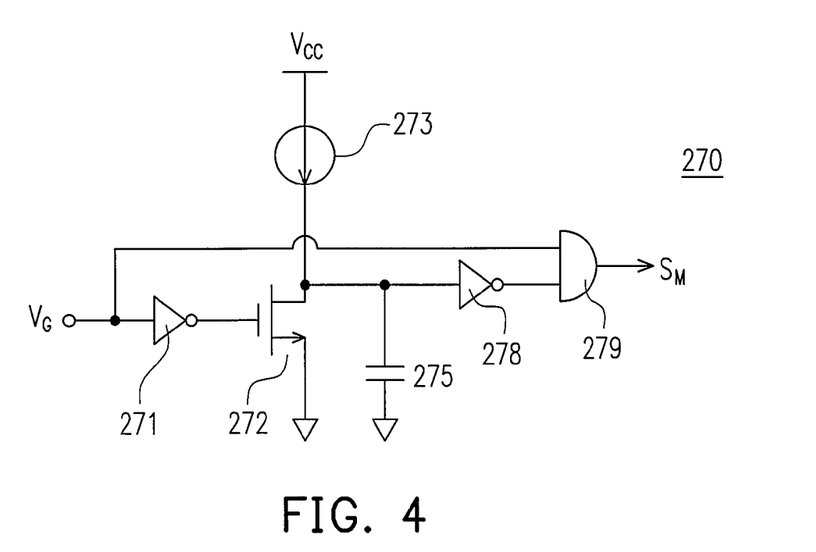
FIG. 4 is a maximum on time (MOT) circuit according to an embodiment of the present invention.

FIG. 4 is an embodiment of the maximum on time circuit 270. A current source 273 is connected to charge a capacitor 275. A transistor 272 is connected to discharge the capacitor 275. The gate-drive signal $V_G$ is coupled to control the transistor 272 through an inverter 271. The gate-drive signal $V_G$ is further connected to an AND gate 279. Another input of the AND gate 279 is coupled to the capacitor 275 via an inverter 278. Once the gate-drive signal $V_G$ is enabled, the output of the AND gate 279 will generate the maximum-on-time signal $S_M$ to disable the gate-drive signal VG after the blanking time. The blanking time is determined by the current of the current source 273 and the capacitance of the capacitor 275.

Figure 5:
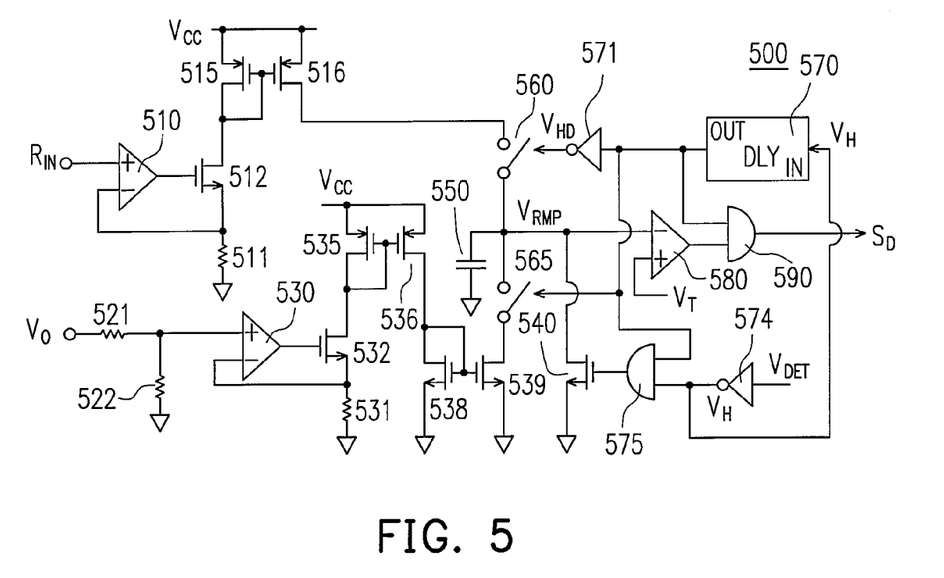
FIG. 5 is a pulse-width prediction circuit of the synchronous rectifier according to an embodiment of the present invention.

FIG. 5 is an embodiment of the pulse-width prediction circuit. An operational amplifier 510, transistors 512, 515, 516 and a resistor 511 develop a voltage-to-current converter. The operational amplifier 510 is coupled to the input terminal $R_{IN}$ to receive the switching voltage of the transformer 10 for generating a charge-current on the transistor 516. An operational amplifier 530, a resistor 531 and transistors 532, 535, 536, 538, 539 develop another voltage-to-current converter. The operational amplifier 530 is coupled to the output voltage $V_O$ of the power converter through the VCC terminal and resistors 521 and 522 for generating a discharge-current on the transistor 539. The charge-current is coupled to charge a capacitor 550 via a switch 560. The discharge-current is coupled to discharge the capacitor 550 through a switch 565. An inverter 574 is coupled to the output $V_{DET}$ of the comparator 230, as shown in FIG. 3, for generating a signal $V_H$. The signal $V_H$ is further coupled to generate a discharge signal through a delay circuit (DLY) 570. The discharge signal is connected to control the switch 565. The discharge signal is further connected to an inverter 571 to generate a charge signal $V_{HD}$ for controlling the switch 560. A ramp signal $V_{RMP}$ is generated at the capacitor 550. The positive input of a comparator 580 comprises a threshold $V_T$. The negative input of the comparator 580 is coupled to the ramp signal $V_{RMP}$. The output of the comparator 580 and the discharge signal are connected to an AND 590 to generate the discontinuous-mode signal $S_D$. Furthermore, the discharge signal and the signal $V_H$ are coupled to reset the capacitor 550 through a transistor 540 and an AND gate 575. The discontinuous-mode signal $S_D$ is therefore generated in response to the switching voltage (the amplitude and the duty cycle) of the transformer 10 and the output voltage $V_O$ of the power converter.

Figure 6:
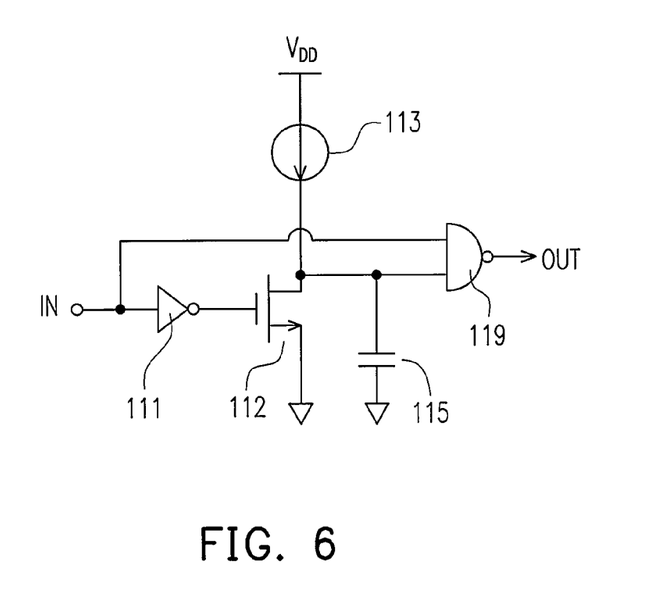
FIG. 6 shows a schematic diagram of a delay circuit according to an embodiment of the present invention.

FIG. 6 shows the circuit schematic of an embodiment of a delay circuit. A current source 113 is connected to charge a capacitor 115. A transistor 112 is connected to discharge the capacitor 115. The input signal IN is coupled to control the transistor 112 through an inverter 111. The input signal IN is further connected to an NAND gate 119. Another input of the NAND gate 119 is coupled to the capacitor 115. The output of the NAND gate is the output of the delay circuit. When the input signal is a logic-low, the capacitor 115 is discharged and the output of the NAND gate 119 is the logic-high. When the input signal is changed to the logic-high, the current source 113 will start to charge the capacitor 115. The NAND gate 119 will output a logic-low once the voltage of the capacitor 115 is higher than the input threshold of the NAND gate 119. The current of the current source 113 and the capacitance of the capacitor 115 determine a delay time $T_P$ of the delay circuit. The delay time $T_P$ is started from the logic-high of the input signal to the logic-low of the output signal of the delay circuit.

Figure 7:
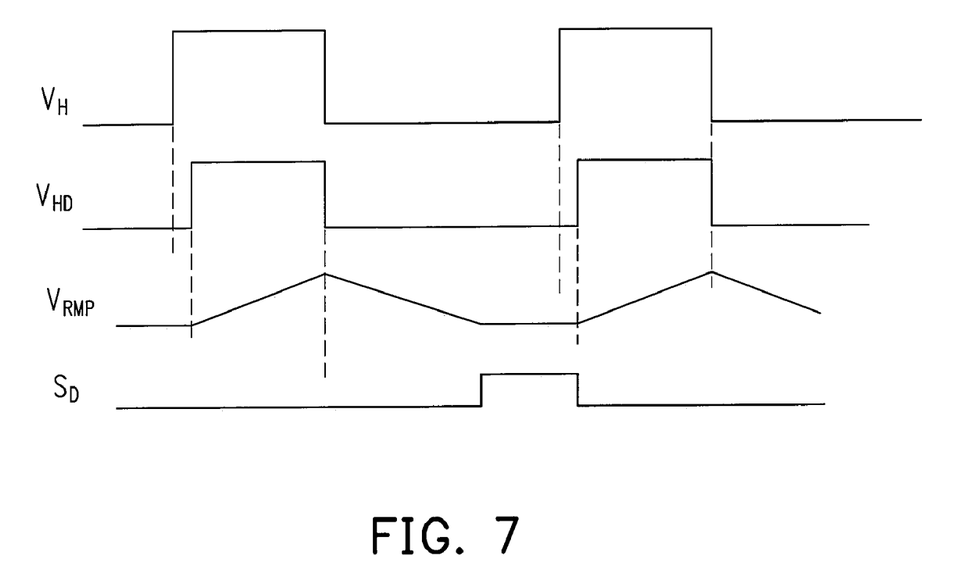
FIG. 7 shows signal waveforms of the pulse-width prediction circuit.

FIG. 7 show signal waveforms of the pulse-width prediction circuit. The ramp signal $V_{RMP}$ is reset between the rising edge of the signal $V_H$ and the rising edge of the charge signal $V_{HD}$. The ramp signal $V_{RMP}$ is increased during the enabling period of the charge signal $V_{HD}$. The ramp signal $V_{RMP}$ is discharged once the charge signal $V_{HD}$ is disabled. The discontinuous-mode signal $S_D$ is generated at the end of the discharge time of the ramp signal $V_{RMP}$. It means the power switch 400 of the synchronous rectifier 50 will be disabled when the transformer 10 is fully demagnetized (discontinuous mode).

Figure 8:
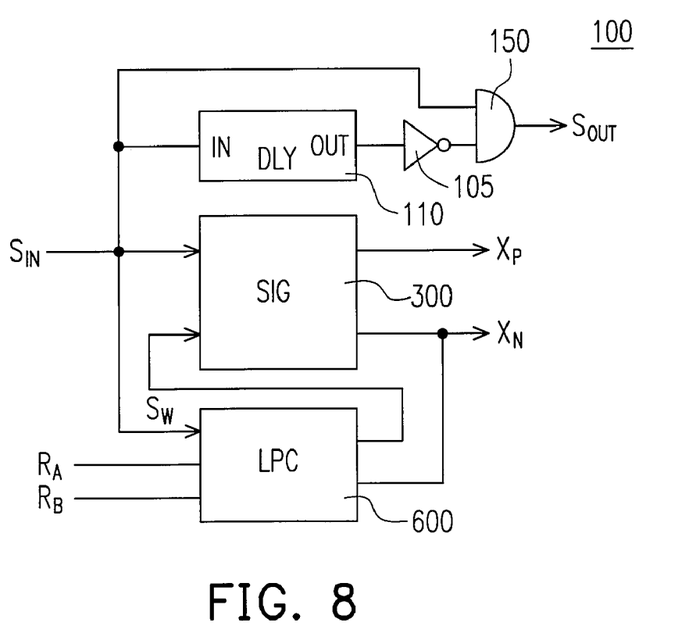
FIG. 8 is a schematic diagram of a pulse generator according to the present invention.

FIG. 8 is the block schematic of an embodiment of the pulse generator 100 of FIG. 1. The drive signal $S_{OUT}$ is generated in response to the switching signal $S_{IN}$. The switching signal $S_{IN}$ is connected to the input of a delay circuit (DLY) 110. The output of the delay circuit 110 is connected to the input of an AND gate 150 through an inverter 105. Another input of the AND gate 150 is coupled to the switching signal $S_{IN}$. The output of the AND gate 150 generates the drive signal $S_{OUT}$ and is coupled to switch the transformer 10. A time delay is thus developed between the enabling of the switching signal $S_{IN}$ and the enabling of the drive signal $S_{OUT}$. The pulse generator 100 further includes an input voltage terminal $R_A$ coupled to receive an input voltage signal representative of an input voltage $V_{IN}$ of the transformer 10. A program terminal $R_B$ is used for programming a program signal that stands for the output voltage $V_O$ of the power converter. The program signal, the input voltage signal and the switching signal $S_{IN}$ are coupled to a linear-predict circuit (LPC) 600. The linear-predict circuit 600 will generate a linear-predict signal $S_W$ to turn off the power switch 400 in accordance with the input voltage signal, the program signal and the pulse width of the switching signal $S_{IN}$. Both the linear-predict signal $S_W$ and the switching signal $S_{IN}$ are further coupled to the signal generation (SIG) circuit 300 to generate the pulse signal on the first output terminal $X_P$ and the second output terminal $X_N$.

Figure 9:
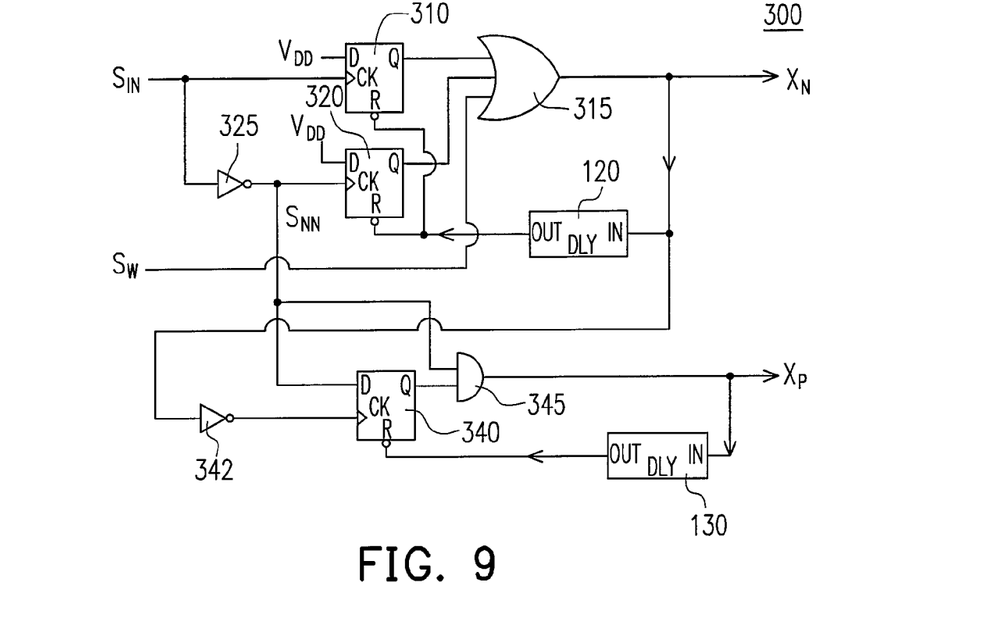
FIG. 9 is an embodiment of a signal generation circuit according to the present invention.

FIG. 9 is the circuit of an embodiment of the signal generation circuit 300. The clock-input of a flip-flop 310 is coupled to receive the switching signal $S_{IN}$ and generates a first signal connected to the first-input of an OR gate 315. The switching signal $S_{IN}$ further generates a signal $S_{NN}$ through an inverter 325. The signal $S_{NN}$ is connected to drive the clock-input of a flip-flop 320. The flip-flop 320 outputs a second signal connected to the second-input of the OR gate 315. The linear-predict signal $S_W$ is connected to the third-input of an OR gate 315. The OR gate 315 is utilized to generate a negative-pulse signal at the second output terminal $X_N$ for turning off the synchronous rectifier 50. The negative-pulse signal is coupled to reset flip-flops 310 and 320 through a delay circuit 120. The delay time of the delay circuit 120 determines the pulse width of the negative-pulse signal. The signal $S_{NN}$ is coupled to the D-input of a flip-flop 340 and the input of an AND gate 345. Through an inverter 342, the clock-input of the flip-flop 340 is coupled to the second output terminal $X_N$ to receive the negative-pulse signal. The output of the flip-flop 345 is connected to another input of the AND gate 345. The AND gate 345 is utilized to generate a positive-pulse signal at the first output terminal $X_P$. The positive-pulse signal is coupled to reset the flip-flop 345 via a delay circuit 130. The delay time of the delay circuit 130 determines the pulse width of the positive-pulse signal. The pulse signal is therefore developed by the positive-pulse signal and the negative-pulse signal on the first output terminal $X_P$ and the second output terminal $X_N$.

Figure 10:
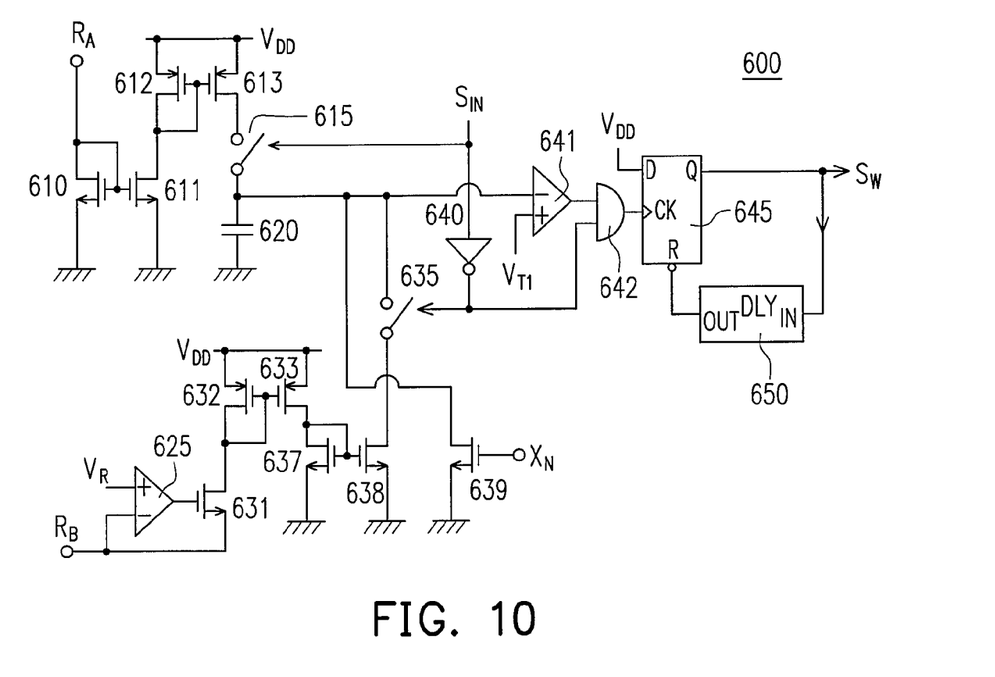
FIG. 10 is a linear-predict circuit of the pulse generator according to an embodiment of the present invention.

FIG. 10 is an embodiment of the linear-predict circuit 600. Transistors 610 and 611 form a current mirror coupled to the input voltage terminal $R_A$ to receive a current representative of the input voltage signal. Transistors 612 and 613 form another current mirror coupled to transistors 610, 611 for generating a charge-current at the transistor 613. The positive input of an operational amplifier 625 includes a reference voltage $V_R$. The negative input of the operational amplifier 625 is coupled to the program terminal $R_B$ to generate a current stands for the program signal. The operational amplifier 625, a transistor 631 associate with the resistor 80 of FIG. 1 generate the current at the transistor 631. Transistors 632, 633, 637 and 638 develop current mirrors coupled to the transistor 631 to produce a discharge-current at the transistor 638.

The charge-current is coupled to charge a capacitor 620 via a switch 615. The discharge-current is coupled to discharge the capacitor 620 through a switch 635. An inverter 640 is coupled to receive the switching signal $S_{IN}$ for producing a discharge signal. The discharge signal is connected to control the switch 635. The switching signal $S_{IN}$ is further connected to control the switch 615. A slope signal is generated at the capacitor 620. The positive input of a comparator 641 comprises a threshold $V_{T1}$. The negative input of the comparator 641 is coupled to the slope signal. The output of the comparator 641 and the discharge signal are connected to an AND gate 642 to generate the linear-predict signal $S_W$ through a flip-flop 645. Furthermore, the linear-predict signal $S_W$ is coupled to reset the flip-flop 645 through a delay circuit 650. The linear-predict signal $S_W$ is therefore generated in response to the input voltage signal, the program signal and the pulse width of the switching signal $S_{IN}$. The value of the program signal stands for the output voltage VO of the power converter.

When the power converter operated in the boundary mode, the magnetized flux $\Phi_C$ of the inductor is equal to the demagnetized flux $\Phi_D$. The boundary mode means the power converter is operated between the continuous mode and the discontinuous mode.

The equality is shown as, $$\Phi_C = \Phi_D \quad (4)$$

$$\Phi = B \times Ae = \frac{V \times T}{N} \quad (5)$$

$$\left(\frac{V_{IN} \times N_S}{N_P}\right) \times T_{CHARGE} = V_O \times T_{DISCHARGE} \quad (6)$$

$$T_{DISCHARGE} = \left[\left(\frac{V_{IN} \times N_S}{N_P}\right) / V_O\right] \times T_{CHARGE} \quad (7)$$

where B is the flux density; Ae is the cross-section area of the transformer 10; the magnetized time ($T_{CHARGE}$) is the pulse width of the switching signal $S_{IN}$; the demagnetized time ($T_{DISCHARGE}$) of the transformer 10 shows the boundary condition of the power converter.

The demagnetized time $T_{DISCHARGE}$ of the transformer 10 can be obtained in accordance with equation (7). It also shows the demagnetized time $T_{DISCHARGE}$ can be predicted in accordance with the input voltage $V_{IN}$, the output voltage $V_O$ and the magnetized time $T_{CHARGE}$ (the pulse width of the switching signal $S_{IN}$). The discontinuous-mode signal $S_D$ is generated in response to the demagnetized time $T_{DISCHARGE}$.

Figure 11:
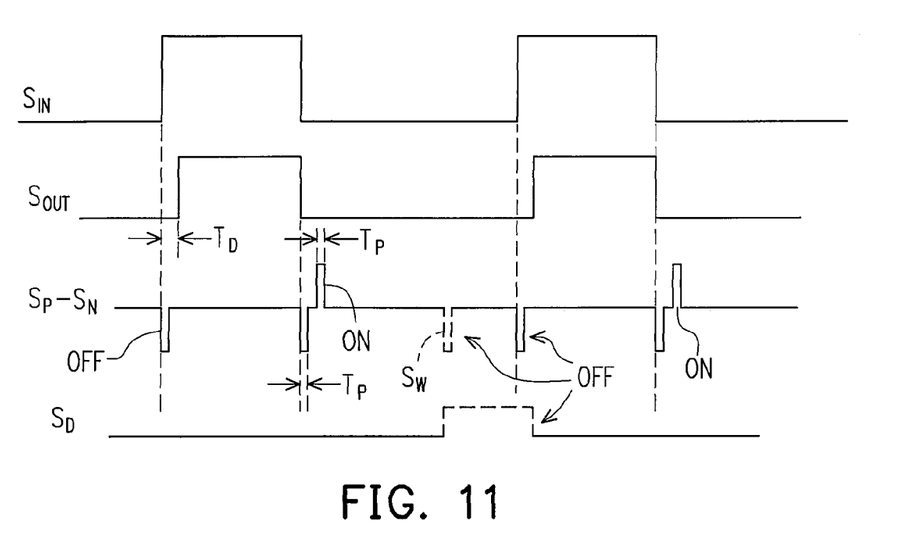
FIG. 11 shows key waveforms of the synchronous rectifying circuit according to an embodiment of the present invention.

FIG. 11 shows waveforms of the synchronous rectifying circuit. The pulse signal $S_P$-$S_N$ (negative pulse signal) is generated in response to the leading edge of the switching signal $S_{IN}$ to disable the power switching 400 of the synchronous rectifier 50. Another pulse signal $S_P$-$S_N$ (negative pulse signal) is also generated in response to the trailing edge of the switching signal $S_{IN}$ to disable the power switch 400 of the synchronous rectifier 50. Following this end of the negative pulse signal, a pulse signal $S_P$-$S_N$ positive pulse signal) is generated to enable synchronous rectifier 50 if the diode 450 of the synchronous rectifier 50 is conducted. The discontinuous-mode signal $S_D$ and the linear-predict signal $S_W$ are generated for turning off the synchronous rectifier 50. It means the power switch 400 of the synchronous rectifier 50 will be disabled when the transformer 10 is fully demagnetized (discontinuous mode). Therefore, the pulse signal is generated to turn off the power switch 400 in response to the magnetizing of transformer 10, and the pulse signal is generated to turn on the power switch 400 in response to the demagnetizing of the transformer 10.

Figure 12:
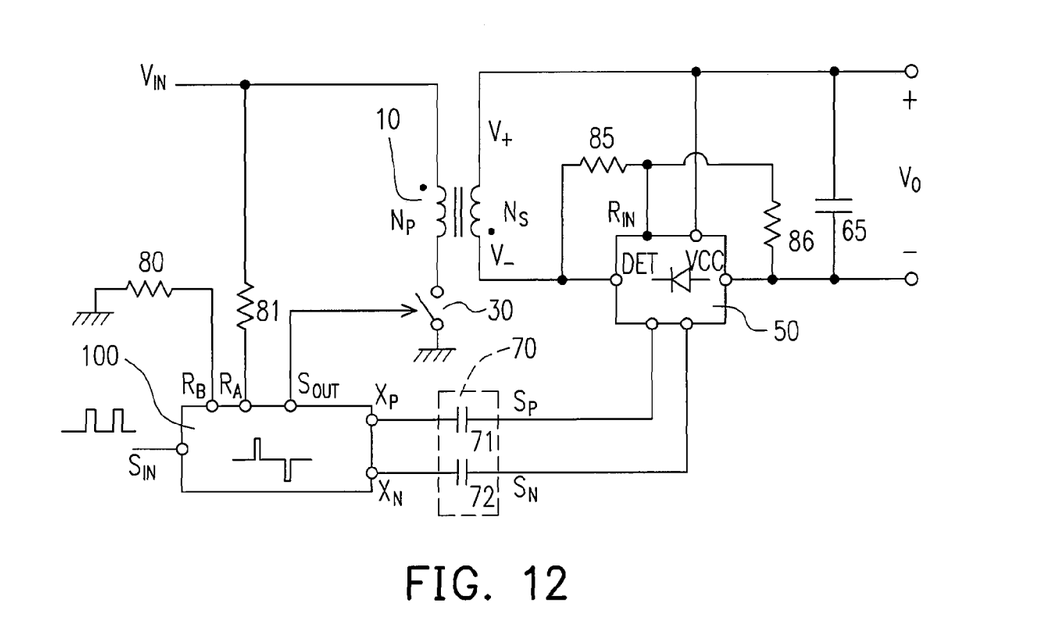
FIG. 12 shows another embodiment of a flyback power converter with synchronous rectifier in which capacitors are used for the isolation device according to the present invention.

FIG. 12 shows capacitors 71 and 72 operated as the isolation device 70 for synchronous rectifying circuit. Because the pulse width of the pulse signal is short, the capacitance of capacitors 71 and 72 can be small such as 20 pF. However a high-voltage rating of the capacitor for capacitors 71 and 72 are required for the isolation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifying circuit for power converter, comprising:

a pulse generator, for generating a pulse signal in response to a rising edge and a falling edge of a switching signal;

an isolation device, coupled to the pulse generator for transferring the pulse signal from a primary side of a transformer to a secondary side of the transformer; and a synchronous rectifier, having a power switch, a diode and a control circuit, wherein the power switch is coupled to the secondary side of the transformer for the rectifying operation, and wherein the control circuit is operated to receive the pulse signal for turning on/off the power switch, wherein the switching signal is used for switching the transformer of the power converter; the diode is coupled to the power switch in parallel, the pulse signal is generated to turn off the power switch in response to a magnetization of transformer; and the pulse signal is generated to turn on the power switch in response to a demagnetization of the transformer.

2. The synchronous rectifying circuit as claimed in claim 1, wherein the pulse generator further generates another pulse signal to turn off the power switch in accordance with a pulse width of the switching signal and an input voltage of the power converter.

3. The synchronous rectifying circuit as claimed in claim 1, wherein the control circuit of the synchronous rectifier turns off the power switch in accordance with the switching signal of the transformer and the output voltage of the power converter.

4. The synchronous rectifying circuit as claimed in claim 1, wherein the power switch is turned on by the pulse signal once the diode is conducted.

5. The synchronous rectifying circuit as claimed in claim 1, wherein the isolation device is a pulse transformer or is composed of a plurality of capacitors.

6. The synchronous rectifying circuit as claimed in claim 1, wherein the pulse signal is a trig signal, the pulse width of the pulse signal is shorter than a pulse width of the switching signal.

7. The synchronous rectifying circuit as claimed in claim 1, wherein the pulse generator further generates a drive signal in response to the switching signal; the drive signal is coupled to switch the transformer; and a time delay is developed between the enabling of the switching signal and the enabling of the drive signal.

8. The synchronous rectifying circuit as claimed in claim 1, wherein the pulse generator comprises:

an input voltage terminal, coupled to receive an input voltage signal representative of an input voltage of the transformer; and a program terminal, coupled to generate a program signal, wherein the pulse generator produces the pulse signal to turn off the power switch in accordance with an input voltage signal, the program signal and a pulse width of the switching signal.

9. The synchronous rectifying circuit as claimed in claim 1, wherein the pulse generator comprises:

an input signal terminal, coupled to receive the switching signal;

a first output terminal; and a second output terminal;

wherein the pulse signal is generated at the first output terminal and the second output terminal; the pulse signal is a differential signal; a polarity of the pulse signal determines the pulse signal and is utilized to turn on or off the power switch.

10. The synchronous rectifying circuit as claimed in claim 1, wherein the synchronous rectifier comprises:

a rectifying terminal, coupled to the secondary side of the transformer;

a ground terminal, coupled to the output of the power converter;

a first input terminal; and a second input terminal;

wherein the power switch is connected in between a rectifying terminal and a ground terminal; and the first input terminal and the second input terminal are coupled to receive the pulse signal for turning on/off the power switch.

11. The synchronous rectifying circuit as claimed in claim 1, wherein the control circuit comprises a latch circuit coupled to the first input terminal and the second input terminal to receive the pulse signal for setting or resetting the latch circuit; and the latch circuit is coupled to control the power switch.

* * * * *